US008014508B2

(12) United States Patent
Moss et al.

(10) Patent No.: US 8,014,508 B2
(45) Date of Patent: *Sep. 6, 2011

(54) ACCESS CODE ENHANCEMENT FOR CALLER PREVIEW SERVICE

(75) Inventors: John Wesley Moss, Lake Zurich, IL (US); Robert Stroud, Lago Vista, TX (US); Rick Cherye, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 589 days.

This patent is subject to a terminal disclaimer.

(21) Appl. No.: 12/123,755

(22) Filed: May 20, 2008

(65) Prior Publication Data

US 2008/0219424 A1 Sep. 11, 2008

Related U.S. Application Data

(63) Continuation of application No. 10/348,200, filed on Jan. 21, 2003, now Pat. No. 7,388,951, which is a continuation of application No. 09/253,339, filed on Feb. 19, 1999, now Pat. No. 6,160,876, which is a continuation-in-part of application No. 09/122,484, filed on Jul. 24, 1998.

(51) Int. Cl.
*H04M 3/42* (2006.01)

(52) U.S. Cl. ......... 379/207.11; 379/142.05; 379/201.11; 379/210.02; 379/211.02

(58) Field of Classification Search ............. 379/201.11, 379/207.02, 114.01, 93.02, 142.05, 142.06, 379/142.08, 167.09, 207.11–207.15, 210.02–211.02
See application file for complete search history.

(56) References Cited

U.S. PATENT DOCUMENTS

| 5,033,076 | A | 7/1991 | Jones et al. |
| 5,161,181 | A | 11/1992 | Zwick |
| 5,467,388 | A | 11/1995 | Redd et al. |
| 5,497,414 | A | 3/1996 | Bartholomew |
| 5,533,106 | A | 7/1996 | Blumhardt |
| 5,572,583 | A | 11/1996 | Wheeler et al. |
| 5,729,598 | A | 3/1998 | Kay |
| 5,784,448 | A | 7/1998 | Yaker |
| 5,812,655 | A | 9/1998 | Pickeral et al. |
| 5,850,435 | A | 12/1998 | Devillier |
| 5,905,774 | A | 5/1999 | Tatchell et al. |
| 5,946,381 | A | 8/1999 | Danne et al. |
| 5,991,377 | A | 11/1999 | Malik |
| 6,028,921 | A | 2/2000 | Malik et al. |
| 6,160,876 | A | 12/2000 | Moss et al. |
| 6,173,048 | B1 | 1/2001 | Malik |
| 6,178,232 | B1 | 1/2001 | Latter et al. |
| 6,324,269 | B1 | 11/2001 | Malik |
| 6,324,271 | B1 | 11/2001 | Sawyer et al. |
| 6,332,021 | B2 | 12/2001 | Latter et al. |
| 6,341,161 | B1 | 1/2002 | Latter et al. |
| 6,442,262 | B1 | 8/2002 | Moss et al. |
| 6,459,780 | B1 | 10/2002 | Wurster et al. |
| 6,483,897 | B1 | 11/2002 | Millrod |

(Continued)

OTHER PUBLICATIONS

Faynberg, et al. "On a pre-SPIRITS Implementation in the Lucent Technologies Online Communications Center," Internet draft, <http://www.ietf.org/proceedings/00jul/I-D/spirits-licentocc-00.txt, Feb. 2000.

(Continued)

*Primary Examiner* — MD S Elahee
(74) *Attorney, Agent, or Firm* — Cantor Colburn LLP

(57) ABSTRACT

By manipulating parameters of call setup messages, calls made with a caller's access code in a caller preview service may be completed to the called party of voice mail box with caller identification information displayed.

6 Claims, 5 Drawing Sheets

U.S. PATENT DOCUMENTS

| | | | |
|---|---|---|---|
| 6,496,569 B2 | 12/2002 | Pelletier et al. | |
| 6,498,841 B2 | 12/2002 | Bull et al. | |
| 6,516,057 B2 | 2/2003 | Meek et al. | |
| 6,647,106 B1 | 11/2003 | Hussain et al. | |
| 6,711,243 B1 | 3/2004 | Holt | |
| 7,079,638 B1 | 7/2006 | Beauchamp et al. | |
| 2004/0213391 A1* | 10/2004 | Yau et al. | 379/114.01 |

OTHER PUBLICATIONS

International Search Report for International Application No. PCT/US03/41225, dated Apr. 28, 2004, 4 pages.

Related Application U.S. Appl. No. 09/122,484, pending, filed Jul. 24, 1998.

* cited by examiner

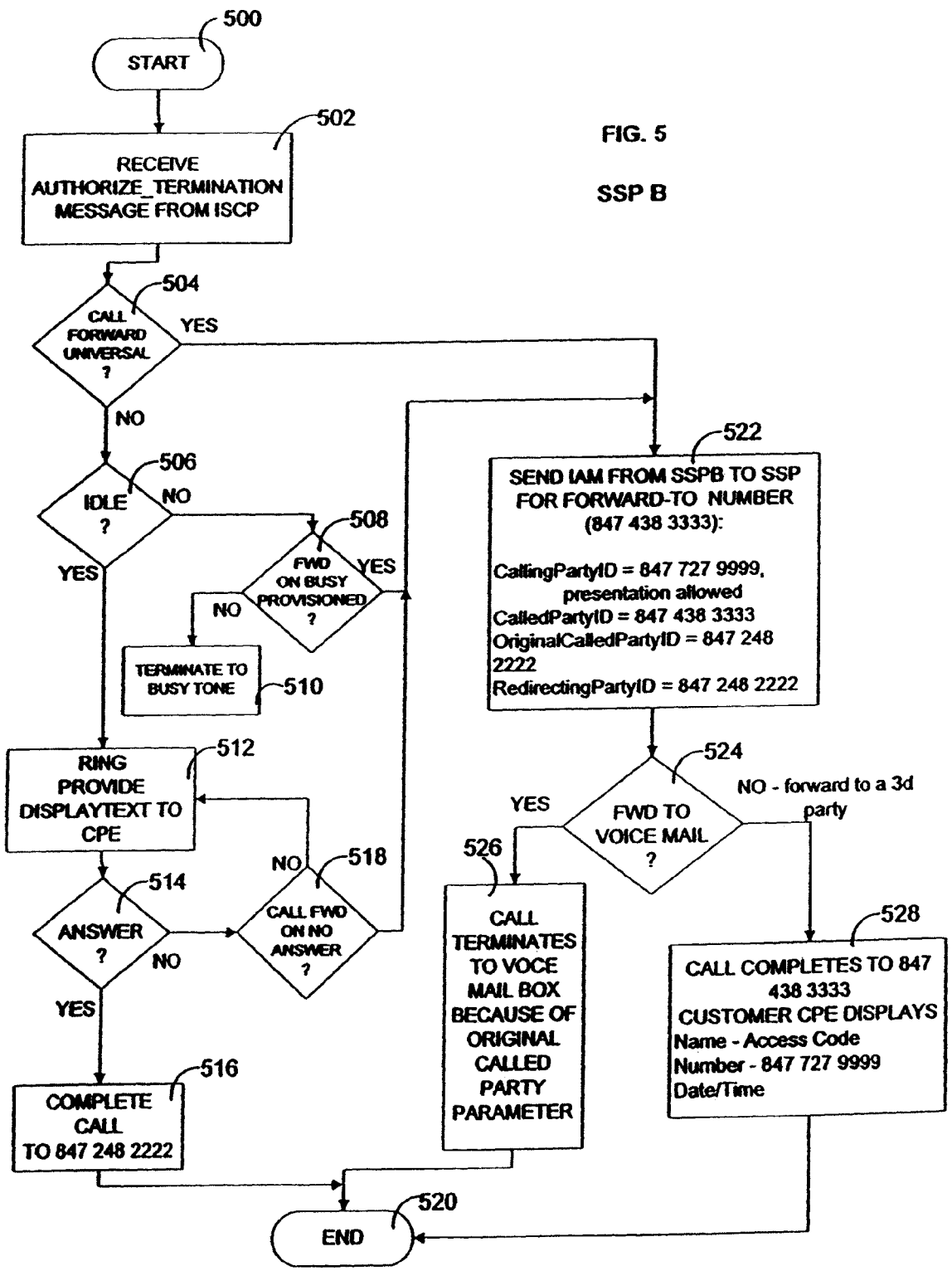

ACCESS CODE ENHANCEMENT FOR CALLER PREVIEW SERVICE

RELATED APPLICATIONS

This application is a continuation of application Ser. No. 10/348,200, filed Jan. 21, 2003, now U.S. Pat. No. 7,388,951, the entire contents of which are incorporated herein by reference. This application is related to application Ser. No. 09/643,553, filed Aug. 22, 2000, now U.S. Pat. No. 6,442,262, which is a continuation of application Ser. No. 09/253,339, filed Feb. 19, 1999, now U.S. Pat. No. 6,160,876, which is a continuation-in-part of application Ser. No. 09/122,484, filed Jul. 24, 1998, pending. These applications are all incorporated herein in their entirety.

BACKGROUND

The present invention relates generally to telecommunications services. More particularly, the present application relates to a method and system for providing enhanced caller identification information including screening invalid calling party numbers.

Telecommunications service providers typically offer services that attempt to provide customers with information that enables them to determine whether or not to accept a call before answering the call. One service that provides such information is caller identification ("Caller ID"). Standard Caller ID services generally provide a customer with an indication of who is calling without requiring the customer to answer the call. These systems typically retrieve information about the calling party from a database and provide that information to the called party. Customer premise equipment (CPE) in the form of a display device is generally used to provide the called party with a visual readout of the name and/or telephone number associated with the calling party.

However, the effectiveness of Caller ID systems can be reduced due to a number of different occurrences. One such occurrence is the inability of a service provider to provide the standard Caller ID information for a particular incoming call. A service provider may not be able to provide the standard Caller ID information if the Caller ID information is blocked by the calling party, or if the Caller ID information is unavailable or incomplete. This may occur, for example, if the calling party pressed *67 when initiating the call.

When the standard Caller ID information cannot be provided, the called party is not adequately informed about who is calling and cannot determine whether or not to accept the incoming call before answering the call. Because the effectiveness of Caller ID systems is greatly reduced when this information cannot be provided, an improved system and method for providing caller identification information that overcome these deficiencies are needed.

Patent application Ser. No. 09/122,484, filed Jul. 24, 1998 is incorporated herein in its entirety. This patent application discloses a privacy management method and system for providing a called party with audible caller identification information when standard caller identification cannot be provided. When standard caller identification cannot be provided, the call is blocked and a request for audible caller identification is transmitted to the calling party. The audible information is subsequently transmitted to the called party.

Patent application Ser. No. 09/253,339, filed Feb. 19, 1999, now U.S. Pat. No. 6,160,876, is also incorporated herein in its entirety. This application discloses a privacy management method for providing enhanced caller identification information when per line blocking of Caller ID is present. When per line blocking is activated for a subscriber line, the Caller ID information for that line is never transmitted by the system.

One privacy management product called Caller Preview Service has been implemented for telephone service subscribers. This product is implemented in equipment of the Advanced Intelligent Network (AIN) telecommunication system. This service intercepts calls that are marked "private," "out of area" or "unknown" on Caller ID Customer Premise Equipment (CPE). When a call for a service subscriber but with an unidentified caller is intercepted at a network switch by the Caller Preview Service, the call is forwarded to an AIN Service Node/Intelligent Peripheral (SN/IP) for disposition. The SN/IP answers the call and gives the caller the option to unblock the call, enter an access code or record the caller's name.

Entry of an access code serves to override the Caller Preview Service. An access code is a ten digit code provided to the caller which, when entered by the caller, is recognized and allows the call to be completed. The access code is typically provided by the Caller Preview Service subscriber to friends, family and other contacts to bypass or override the system. The subscriber may specify and provide a large number of access codes or may provide one or a few access codes to a large number of people.

If the caller enters an access code, the SN/IP originates a new call to the subscriber, ringing the subscriber's line. When the call is answered by the subscriber or the subscriber's voice mail platform, the SN/IP will merge the new call and the original call together. The subscriber's CPE will display "Calling Party=Unknown" and give as the Calling Address the ten digit access code provided by the caller.

This embodiment has been of limited commercial success. For an access code call, the standard Caller ID information still cannot be provided. If the subscriber has provided an access code to a large number of people, the likelihood of even being able to guess the caller's identity is reduced. The called party is not adequately informed about who is calling and cannot determine whether or not to accept the incoming call before answering the call. If the called party has forwarded calls to voice mail, the caller will receive a generic voice mail or call forwarding announcement, not the called party's customized voice mail greeting or other announcement. If the called party has forwarded calls to another directory number (such as universal call forward, call forward on busy, or call forward-don't answer), and the other directory number subscribes to a privacy management service, the calling party will have to interact with the privacy management service a second time when the call is terminated to the forwarded number.

Accordingly, there is a need for an improved system and method for a privacy management system which reliably provides caller identification information even for access code type calls.

BRIEF DESCRIPTION OF THE DRAWINGS

FIGS. 2-5 form a call flow diagram illustrating a method for processing a call in the telecommunications system of FIG. 1.

DETAILED DESCRIPTION OF THE PRESENTLY PREFERRED EMBODIMENTS

By way of introduction, the embodiments disclosed herein may be enhancements to the previous caller preview service to allow access code calls to display correctly on a subscriber's Customer Premise Equipment and, if appropriate, connect to the subscriber's voice mailbox. Also, if calls to the subscriber's directory number are forwarded to another line, the caller will not have to interact with the privacy service a second time. The voice mail interaction occurs when the subscriber has activated Call Forwarding Busy and Call Forwarding Don't Answer, with calls forwarded to the subscriber's voice mail Directory Number.

The preferred embodiments below include a method and system for providing a called party with audible caller identification information when standard caller identification information cannot be provided. In one embodiment, calls for which standard caller identification information is blocked, unavailable or incomplete are prevented from being connected to the called party.

Figure 1:
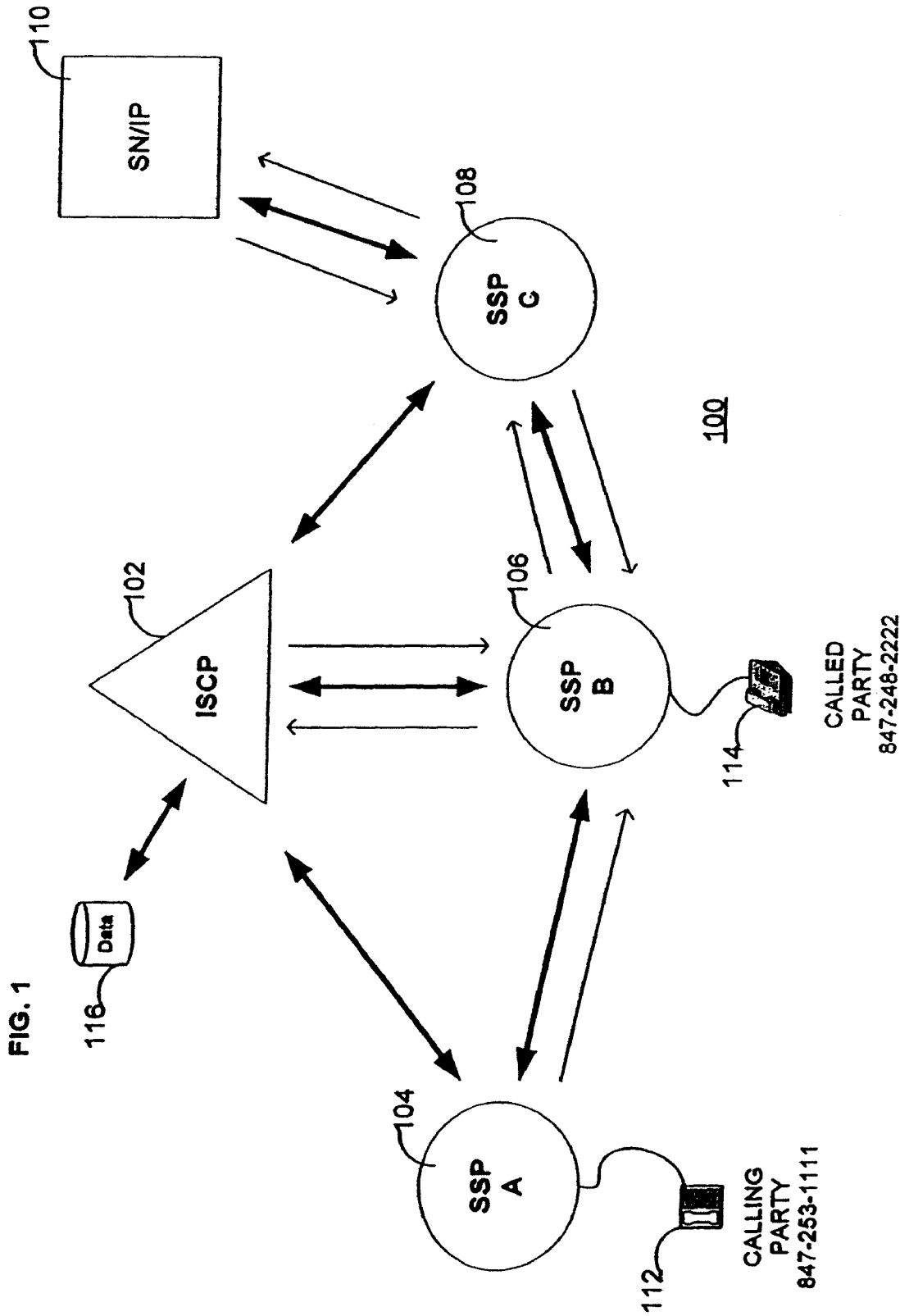
FIG. 1 is a block diagram of a telecommunications system.

Referring now to the drawing, FIG. 1 is a block diagram of a telecommunications system 100. The telecommunications system 100 in the illustrated embodiment includes one or more integrated service control points (ISCP) such as ISCP 102, one or more service switching points (SSP) such as SSP A 104, SSP B 106, SSP C 108 and a service node or intelligent peripheral (SN/IP) 110. These are components of the industry standard Advanced Intelligent Network (AIN). AIN components communicate using Signalling System 7 (SS7), Transaction Capabilities Applications Part (TCAP), or Integrated System Digital Network User Part (ISDN-UP). While AIN components are particularly well suited for implementing the system and method of the present disclosure, other equipment may be substituted or combined with AIN components. For example, all or a portion of the telecommunications system 100 may be implemented using the internet using a suitable communication protocol such as Transaction Control Protocol/Internet Protocol (TCP/IP).

The ISCP 102 is an integrated system which may include a Service Management System (SMS), a Data and Reports System (DRS), a programmable Service Control Point (SCP), and a Service Creation Environment (SCE). The SCE is a software based terminal that may be implemented to work with the SMS to create, modify, and load service control software (i.e., service logic) into the database in the SCP. The SCP executes software-based service logic and may return call routing instructions to the SSPs 104, 106, 108. The SMS and the DRS may be provided for compiling calling information to be used for billing and administrative purposes. By way of example, the ISCP may be implemented with the Bellcore Integrated Service Control Point (ISCP), loaded with preferably at least ISCP software Version 4.0, available from Bell Communications Research, Inc., of Livingston, N.J.

The ISCP 102 may be linked to an external database 116 that stores various routing information, such as information for translating an originating telephone number into the caller's geographic location of origin. The external database 116 may include a line information database (LIDB) running preferably at least software Version LIDB 7.0, available from Bell Communications Research, Inc., of Livingston, N.J. The LIDB stores caller name information accessed by providing a directory number. The LIDB may be accessed by the ISCP 102 or by an SSP which provides a TRI 188 query using the calling party identifier for a call. The external database 116 may be directly accessed by and connected to ISCP 102 via a TCP/IP connection.

For purposes of illustration, three SSPs 104, 106, 108 are shown in FIG. 1. The actual network may be provisioned with more (or fewer) than the number of SSPs shown in FIG. 1. The SSPs 104, 106, 108 are switches which perform at least the following functions: recognizing AIN-type calls; launching queries to the Integrated Service Control Point (ISCP) 102; and receiving commands and data from the ISCP 102 to further process and route AIN-type calls. When one of the SSPs 104, 106, 108 is triggered by an AIN-type call, the SSP formulates an AIN service request or query and responds to call processing instructions from the network element in which the AIN service logic resides. The AIN service logic or control software may reside in a database at the Service Control Point (SCP). The SSPs 104, 106, 108 are connected by trunked communication lines which are used to connect and carry communication signals, e.g., voice and/or data, from a calling party such as a calling party at a calling communication station 112 to a called party such as a called party at called communication station 114.

The SSPs 104, 106, 108 operate as end office switches, providing telephone service to associated calling communication stations and called communication stations. The calling communication station 112 and called communication station 114 are conventional telephone stations. They are shown connected by local loops to their associated SSPs 104, 106, respectively, but one or both of the calling station 112 and called station 114 may be connected to the telecommunications system 100 through a private branch exchange.

In Advanced Intelligent Network (AIN) call processing, a query to a centralized database such as ISCP 102 is triggered by an AIN application. In AIN-type call processing, an SSP is responsible for identifying calls associated with AIN services, detecting when conditions for AIN service involvement are met, formulating service requests for call processing instructions, and responding to the instructions received. The call may be suspended at the calling party's end office or switch equipped as an SSP. The SSP may send a data message, via Signalling System 7 (SS7) links, to establish the call route. AIN services are created by assigning appropriate SSP call suspension points, known as AIN "triggers," accessed via customer lines or telephone numbers, and accessing customer or service-specific logic in the ISCP 102.

The SSPs launching the AIN queries are preferably end office AIN SSPs, 104, 106, 108. This enables the trigger for the subscriber service to be placed against a single telephone directory number (DN) at the end office serving the customer and allows the DN to use trunks and other facilities for call routing. Thus, if an originating call encounters an AIN trigger at the end office, i.e., triggering AIN service involvement, the SSP suspends call processing, then queries the ISCP 102.

As an example, if a calling party at calling communication station 112 desires to contact a called party at the called communication station 114, the calling party dials the directory number (DN) for the called communication station 114. In the illustrated example, the called communication station 114 is assigned a DN of 847-248-2222 and the calling communication station 112 is assigned a DN of 847-253-1111.

The calling party receives a dial tone from the end office, SSP A 104. The SSP A 104 detects the digits dialed by the calling party and routes the call to the appropriate end office, SSP B 106, associated with the called communication station. For routing the call, the SSP A 104 may receive additional call routing instructions from elsewhere in the telecommunications system 100.

At SSP B 106, the call encounters an AIN trigger. In this case, the trigger is a Terminating_Attempt trigger. Upon encountering the trigger, the call is suspended and the SSP B 106 sends a Terminating_Attempt query to the ISCP 102. The Terminating_Attempt query is a message having predefined data fields. Some or all of the data fields are populated with data defining the call. Examples of the data fields include a CalledPartyID, which in this case is the DN of the called communication station 114, 847-248-2222, and the CallingPartyID, which is the DN of the calling communication station 112, 847-253-1111.

In some cases, not all the required data is available to populate the data message of the query. For example, if the caller identification information for the calling communication station 112 can not be provided, the CallingPartyID field will be empty or may be marked "private." The caller identification information for the calling communication station 112 can not be provided if the caller identification information is blocked, is not transmitted by the system or is marked private. For example, if the calling party dials *67 at the calling communication station 112 before dialing the DN of the called communication station 114, the caller identification for the calling communication station will be blocked.

Upon receiving the query message from the AIN SSP-equipped end office, SSP B 106, the ISCP 102 executes software-based service logic programs stored in the SCP to perform subscriber functions and returns a response to the end office, SSP B 106. The response includes call routing instructions to forward the call to the appropriate location, such as SSP C 108. The AIN service application may be stored in an ISCP database such as the ISCP 102, and accessed by a predetermined SSP query launched from the triggering location such as SSP B 106.

After the ISCP 102 has collected the call data, the ISCP 102 will then return control of the call, via a routing number, to the call suspending SSP, SSP B 106 in this example, for termination. Once the subscribed service logic has been completed, control of the originating call may be returned to the triggering SSP. To complete the originating phone call, the ISCP service logic for this service may respond to the SSP query in one of two possible responses. The service may respond with a routing number in a TCAP connect message to the triggering SSP or respond with a message to play an announcement to the caller.

The SN/IP 110 is an AIN element in communication with other components of the communications system 100. The SN/IP may also be implemented as a Remote Module or RM. The SN/IP 110 implements a variety of functions under control of an SSP or ISCP. A call may be routed to the SN/IP 110 for interaction on a real time basis with a caller or called party. For example, a call may be routed to the SN/IP to play announcements to a caller, providing pre-recorded or text-to-speech instructions or menu options for the caller to select from. Further, the SN/IP 110 may be configured to collect data such as caller menu selection data. For example, the SN/IP 110 may detect dual tone, multi frequency (DTMF) keypress data from the caller. In response to this user data, the SN/IP 110 can then send a message to other components of the system 100 to provide the user input. One key advantage of use of the SN/IP 110 for these functions is removal of this functionality from other network equipment, such as SSP C 108. This frees up resources of the other network equipment for call processing.

In the drawing, the SN/IP 110 is illustrated in conjunction with SSP C 108. This is illustrative only. The SN/IP 110 may be located at any convenient location in the system 100 or its functionality may be distributed over a variety of components of the network.

FIGS. 2-5 form a flow diagram illustrating one embodiment of a method for enhancing a caller preview service including an access code feature in a telecommunication system such as the system 100 of FIG. 1. In the exemplary embodiment of the drawing figure, a call is initiated by the calling party at the calling communication station 112 intended for the called communication station 114. The called party at the called communication station 114 is a subscriber to the caller preview service.

Figure 2:
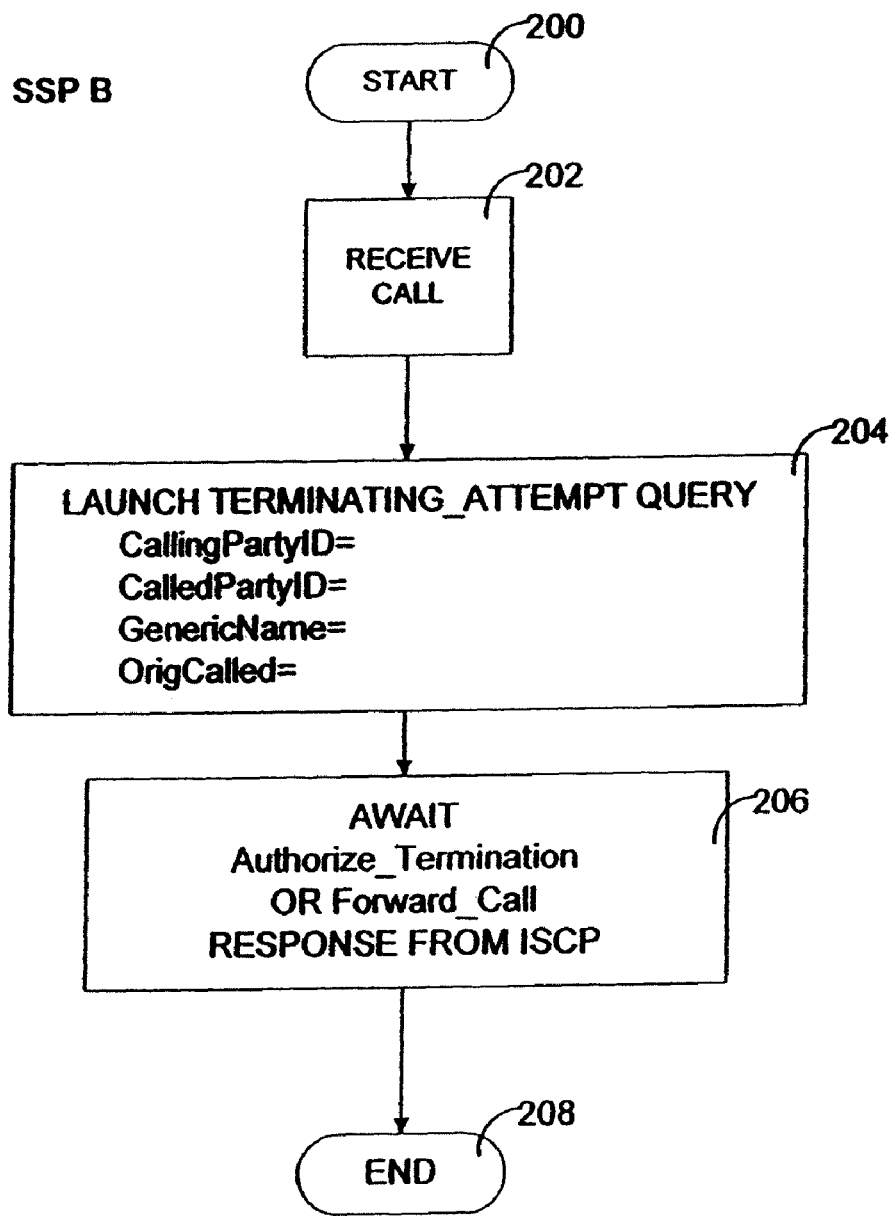

FIG. 2 illustrates operation at the end office switch, SSP B 106, associated with the called communication station 114. The method begins at block 200. Initially, the calling communication station 112, with directory number (DN) 847-253-1111, goes off hook and receives a dial tone from its associated end office, SSP A 104. The calling party at the calling communication station 112 dials *67 847-248-2222. The *67 prefix activates per-call blocking of the caller identification information for this calling communication station 112 for this call. The directory number 847-248-2222 is the DN of the called communication station 114.

In response to the received DN, the end office switch, SSP A 104, obtains call routing information for the call. The call routing information may come from any appropriate source in the network and directs the SSP A 104 to route the call to SSP B 106. For routing the call, an SS7 initial address message (IAM) is sent by SSP A 104 to SSP B 106. An IAM is a message sent in the forward direction to initiate seizure of an outgoing circuit or trunk and to transmit number and other information relating to routing and handling of a call. The IAM from SSP A 104 to SSP B 106 includes the DN for the called communication station 114 and the DN for the calling communication station 112. However, this DN is marked private to indicate that it should not be transmitted to the called communication station 114. Thus, in one embodiment, the IAM includes the following parameters:

CallingPartyID=8472531111, marked Private
CalledPartyID=8472482222
GenericName=Private The IAM may include other data as well, depending on the particular implementation and routing circumstances.

At block 202, the SSP B 106 receives the IAM and begins processing the call. The SSP B 106 encounters a Terminating_Attempt Trigger and, at block 204, launches a Terminating_Attempt query to the ISCP 102. The Terminating_Attempt query includes the following parameters:

CallingPartyID=8472531111, marked Private
CalledPartyID=8472482222
GenericName=Private
OriginalCalledID={empty}
RedirectingPartyID={empty}

The OriginalCalledID parameter stores the directory number which was the original destination for the call, regardless of any forwarding or redirection of the call. This parameter is blank or empty if the call has not yet been redirected. The RedirectingPartyID stores the directory number of the last destination for the call, but is blank or empty if the call has not yet been redirected. In this example, the call has not yet been redirected so OriginalCalledID and RedirectingPartyID are empty. The Terminating_Attempt query may include other data and other parameters as well.

At block 206, the terminating end office, SSP B 106, awaits receipt of a response from the ISCP 102. The response will be in the form of either an Authorize_Termination response message or a Forward_Call response message, depending on signaling information provided to the ISCP 102. This message will contain call routing and processing data as determined by the ISCP 102. At block 208, processing of this call ends at the SSP B 106 when the Authorize_Termination or Forward_Call message is received.

Figure 3:
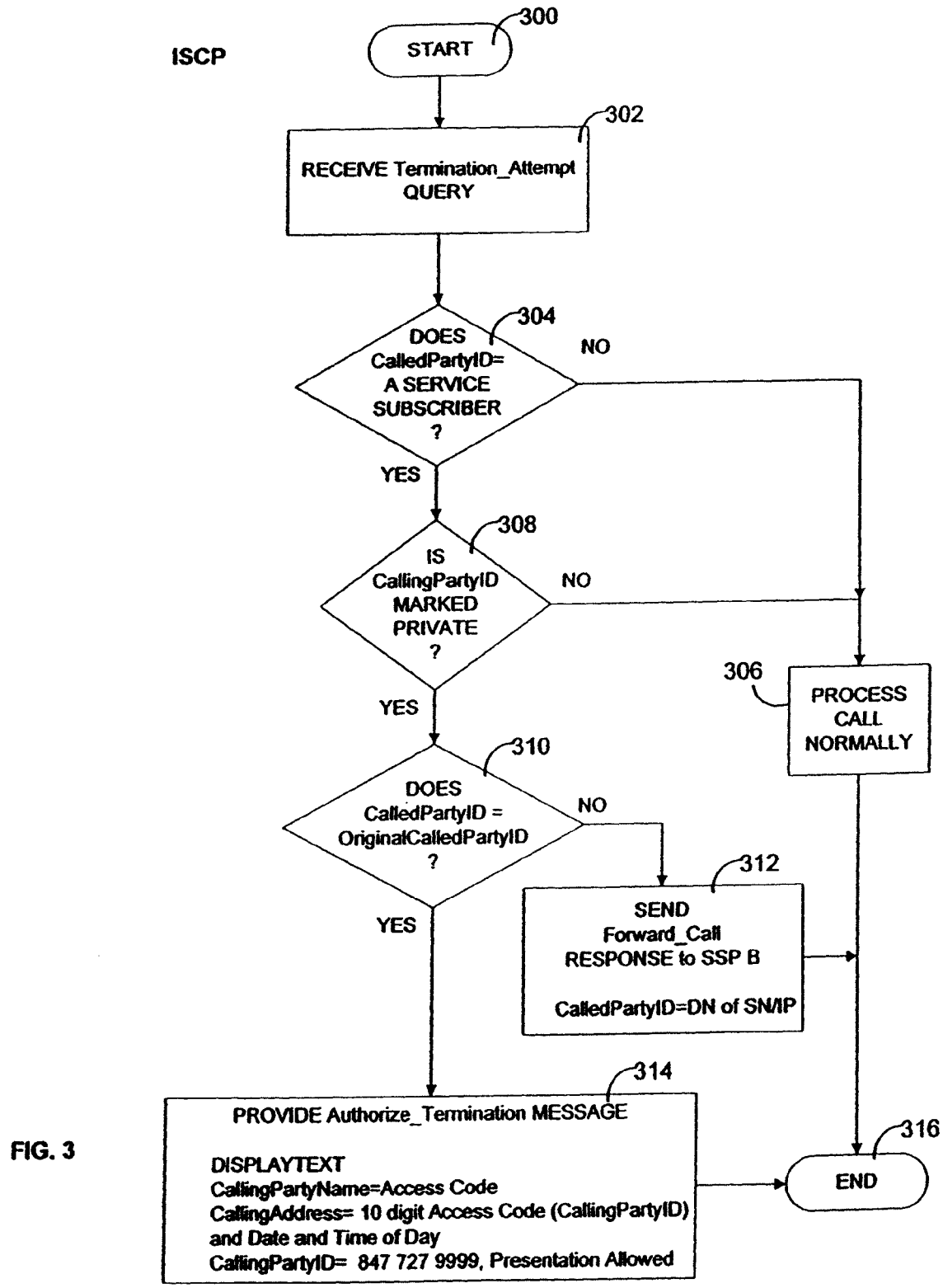

FIG. 3 is a flow diagram illustrating one example of call processing at the ISCP 102 of FIG. 1. The exemplary method begins at block 300. At block 302, the ISCP 102 receives the Terminating_Attempt query from the terminating switch, SSP B 106. In this example, the Terminating_Attempt query includes the parameters specified above. The ISCP 102 retrieves the values for these parameters for processing the call.

At block 304, the ISCP determines if the called party or the called communication station 114 is a subscriber to the caller preview service. Caller preview service is a call management feature which intercepts calls that are marked "private," "out of area" or "unknown" on caller identification Customer Premise Equipment (CPE). When calls from unidentified callers are intercepted by the service, the call is automatically answered and the caller is given the option to unblock the call, enter an access code or record a spoken name. If the caller enters an access code, a new call is originated to the called party, to be merged with the initial call from the calling party. In some implementations, this service is provided only to subscribers who elect the service or who pay for it.

To determine if the called communication station is a subscriber, the ISCP 102 consults stored subscription data. For example, the ISCP database 116 may store information about service provisioning. The ISCP 102 queries this database by passing the DN of the called communication station 114, 847-248-2222. The database 116 returns the subscription information for the called communication station.

Also, in the illustrated embodiment, the database 116 stores information for use during processing of access code calls. One example is the name information associated with directory numbers, stored in a name and number database. The ISCP 102 will return the number and its associated information. In other embodiments, this information may be stored in other locations or accessed in other manners.

If the called communication station 114 is not a subscriber to the caller preview service, the call is processed normally, block 306. The ISCP 102 returns an Authorize_Termination message with no display information. Otherwise, control proceeds to block 308 for further call processing.

The next steps are used to further determine if the call is a call to be processed by the Caller Preview service or if the caller is an identified caller. More particularly, the SCP determines if the call is an access code call. At block 308, it is determined if the CallingPartyID parameter of the Terminating_Attempt query is blocked, unavailable or otherwise can not be provided. If not, and the CallingPartyID parameter can be provided, call processing continues normally at block 306. In normal processing, the Caller ID information for the call will be provided to the called party, his voice mailbox or a third party telephone number to which calls are forwarded.

If at block 308, the CallingPartyID parameter can not be provided, at block 310, one or more specified parameters of the Terminating_Attempt query are tested to identify an access code call. Access code calls are identified so that they may be presented to the Caller Preview Service subscriber. If the specified parameters do not indicate an access code (no match), the call will be forwarded to the SN/IP for processing to the customer. In the embodiment illustrated in the drawing, two parameters of the Terminating_Attempt query are compared. As will be discussed in greater detail below, the specified query parameters are set in a predetermined manner at the SN/IP 110 during call processing to indicate to the ISCP 102 that the call is an access code call. Any desired parameters can be used, and any predetermined relationship can be specified to be tested and recognized at the ISCP 102. In the illustrated example, the ISCP 102 tests the value of two parameters of the Terminating_Attempt query, the CalledPartyID parameter and the OriginalCalledPartyID parameter. In particular, the ISCP 102 tests to determine if these parameters are set to equal values. The actual value of the selected parameters is not significant, although in this example, the CalledPartyID is used to route the call to the called communication station 114. Similarly, equivalent parameter values are not required. For example, in another embodiment, the OriginalCalledPartyID could be incremented by one number relative to the CalledPartyID, with the ISCP 102 testing that relationship in block 310.

If the specified parameters of the Terminating_Attempt query do not have the required value or relationship indicating an access code call, at block 312 the ISCP generates a Forward_Call response message which directs the SSP B 106 to forward the call to the SN/IP 110 or other appropriate network equipment to further process the call. Among parameters stored in the Forward_Call response message is the parameter CalledPartyID. The ISCP 102 sets this parameter to the directory number of the SN/IP or other equipment to handle the call. Other parameters may also be set to desired or required values for subsequent processing. The method ends at block 316.

Otherwise, the call has been identified at the ISCP as an access code call. At block 314, the ISCP returns an Authorize_Termination response to the Terminating_Attempt query. The Authorize_Termination response is set with parameters to control subsequent processing of the access code call. In the illustrated embodiment, the ISCP responds with the following parameters:

CallingPartyID=8477279999, allowed
DISPLAYTEXT
CallingPartyName=AccessCode
CallingAddress=10 digit access code
Date and Time of Day If switch based call forwarding is active and a new access code call is forwarded, the new calling party ID, with privacy indicator set to "allowed," is used to allow proper processing of the access code call without requiring the calling party to interact again with privacy management service. In accordance with one embodiment, one directory number in the calling region is assigned in the line information database (LIDB) with its associated name value set to "Access Code." In the illustrated example, this assigned access code DN is 8477279999 and may be referred to as the access code directory number. The ISCP returns this value in the Authorize_Termination response message when the calling party has entered a legitimate 10 digit access code. DISPLAYTEXT is data defining text to be displayed on the called party's customer premise equipment (CPE). The DISPLAYTEXT will be used to identify the call to the true caller preview service customer.

The service logic associates the CallingPartyID parameter with access code calls. In this case, having recognized during execution of blocks 304, 308, 310, that an access code call is being processed, the ISCP 102 formats an Authorize_Termination response message with the DN for access code calls. In this example, this is indicated by the designated access code directory number 847-727-9999. With the Display Text parameter set in the response, when the call is completed to the subscriber's CPE, the CPE will display the textual information conveyed in the message. The service logic associates the CallingPartyID and the Displaytext parameters with an access code call. This includes the name information in the CallingPartyName parameter ("Access Code") to signal that an access code call has been received, and the access code entered by the caller. Using the CallingPartyID field in this manner allows the call to be processed properly even when the called party has set call forwarding to another directory number, as will be described in greater detail below in conjunction with FIG. 5. Moreover, the call will be completed without the calling party having to be prompted again for entry of the access code. The method ends at block 316.

The Forward_Call response or the Authorize_Termination response is transmitted to SSP B 106. In the case of a Forward_Call response, the SSP B 106 responds to the message and forwards the call to the SSP C 108 and the SN/IP 110. This destination is determined by the CalledPartyID parameter, set equal to the DN of the SN/IP by the ISCP (block 312).

SSP B 106 responds to the Forward_Call message by preparing an IAM for communication to the SSP C 108. In one embodiment, the parameters of the IAM include the following:

CallingPartyID=8472531111, marked private
CalledPartyID=directory number of the SN/IP
OriginalCalledID=8472482222

Thus, the IAM retains the calling line identifier of the calling communication station and its designation as private. The CalledPartyID parameter indicates the SN/IP SSP C 108 as the destination for the call. The parameter OriginalCalledID indicates that the directory number originally intended as the destination for the call is the DN of the called communication station 114. Other parameters may be included in the IAM as well. The initial address message is forwarded to the SSP C.

Figure 4:
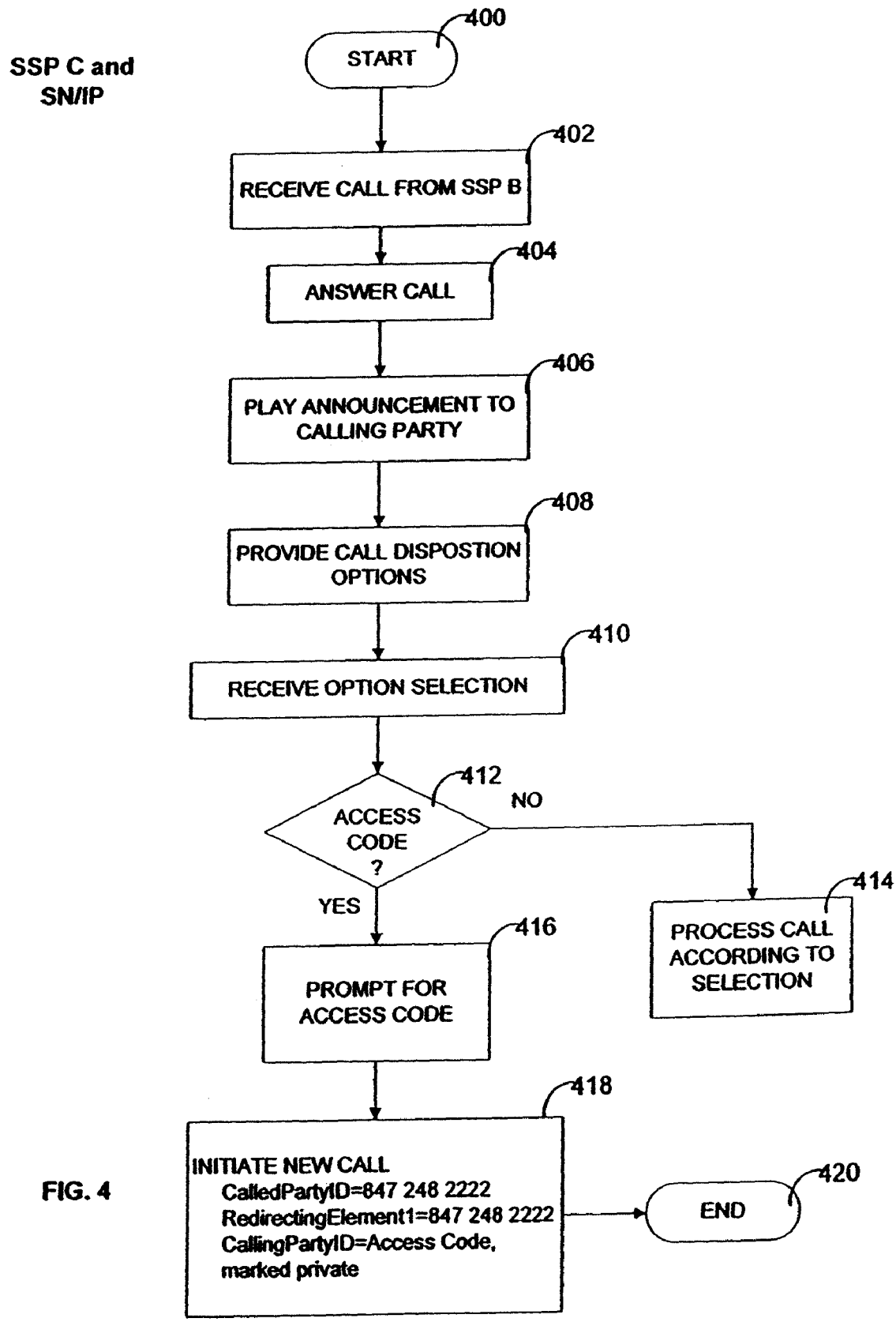

FIG. 4 is a flow diagram illustrating one example of call processing at the SSP C 108 and the SN/IP 110. The exemplary method begins at block 400.

At block 402, the call is received at the SSP C 108 from SSP B 106. The SSP C 108 receives an initial address message (IAM) from the SSP B 106. For communication with the SN/IP, the SSP C 108 converts the SS7 IAM to a primary rate interface (PRI) setup message. The parameters of the PRI setup message are as follows:

CallingPartyID=8472531111, marked private
CalledPartyID=directory number of the SN/IP
RedirectingElement1=8472482222

At block 404, the SN/IP answers the call and plays an announcement to the calling party. The message may be provided by playing a prerecorded message, by doing a text to speech conversion, or by any other method. In one embodiment, at block 406 the caller preview service is announced and at block 408 call disposition options are provided. The calling party is prompted to temporarily unblock the caller's calling line identification by pressing 0 on the calling communication station 112, to enter an access code after pressing 1 or to record the caller's name for playback to the called party after pressing 2. Playing messages to a caller and collecting caller input are well within the capabilities of a conventional service node or intelligent peripheral such as SN/IP 110. Other types or combinations of menu options or specific menu choices may be provided.

At block 410, the option selection entered by the caller is received. In the preferred embodiment, the caller presses one or more keypad keys to enter a selection. The keypresses generate audible DTMF codes which are detected by the SN/IP and converted to data. At block 412, the received option selection is analyzed. If the selection does not correspond to entry of an access code (a 1 keypress in the example above), at block 414 the call is processed according to the selection.

However, if the selection corresponds to the caller's option to enter an access code, at block 416 the caller is prompted to enter the access code. A recording may be played by the SN/IP or a text to speech process may cause the prompt to be played. The SN/IP then detects DTMF entries from the calling communication station. The DTMF codes are detected and converted to data. At this time, the access code may be checked for validity. In the illustrated embodiment, the entered access code is a ten digit value 999999999.

At block 418, after receiving the caller's access code, the SN/IP initiates a new call to the called communication station to present the access code to the called party. For this call, a primary rate interface (PRI) setup message is established. Specified query parameters are set in the PRI setup message in a predetermined manner at the SN/IP 110 during call processing to indicate to the ISCP 102 that the call is an access code call. Any desired parameters can be used, and any predetermined relationship can be specified to be tested and recognized at the ISCP 102. In the illustrated example, two specified parameters of the message are set equal. The PRI setup message is established with the following parameters:

CallingPartyID=the 10 digit access code (9999999999), marked private
CalledPartyID=8472482222
RedirectingElement1=8472482222

This message format is exemplary. Other parameters, such as RedirectingElement2, could be used in the PRI setup message.

Thus, the status of the call as an access code call, along with the relevant calling information, is encoded in the call setup message. The relevant calling information includes the identity of the called party and the access code. Here, the nature of the call as an access code call is indicated by marking the CallingPartyID private and setting the RedirectingElement1 equal to the CalledPartyID. Any set of parameters can be chosen, and any matching relation can be specified so long as other equipment of the network uses the same definition when decoding the call processing message. The PRI setup message is passed to the SSP C 108.

In response to the PRI setup message, the SSP C 108 generates an initial address message to forward the call to the SSP B 106 for termination to the called communication station, as set by the CalledPartyID parameter of the PRI setup message. In the exemplary embodiment, the SSP C 108 generates an IAM with the following parameters:

CallingPartyID=Access Code (9999999999), marked private
CalledPartyID=8472482222
OriginalCalledParty=8472482222

Thus, the SSP C 108 converts the PR setup message from the SN/IP to an SS7 IAM in which the CalledPartyID and the OriginalCalledPartyID are set equal. The initial address message may include other parameters as well, or these parameters may be modified while retaining the same functionality. When the SSP C 108 converts the PRI setup message to an SS7 IAM to be sent to SSP B, 106, the GenericName parameter is not included. This is because the SN/IP is setting the privacy bit against the CallingPartyID instead of including *67. Since *67 is not included, the SSP C blocking software is escaped. The IAM is communicated from the SSP C 108 to the SSP B 106. The method at the SN/IP 110 ends, block 420.

When the call is processed at the SSP B 106, a Terminating_Attempt trigger is encountered. The SSP B recognizes the trigger and generates a Terminating_Attempt query to the ISCP 102. This query includes the following parameters:

CallingPartyID=Access Code (9999999999), marked private
CalledPartyID=8472482222
OriginalCalledParty=8472482222

This query is processed at the ISCP according to the exemplary embodiment of FIG. 3. This time at the ISCP 102, the Terminating_Attempt query is received, block 302. If the CalledPartyID corresponds to a service subscriber, block 304, then at block 308 the message parameters are tested to determine if the CallingPartyID is marked private. In the query above, this is true, so at block 310, the ISCP tests if the CalledPartyID is equal to the OriginalCalledPartyID of the Terminating_Attempt query. This time, after processing the access code call at the SN/IP and SSP C, these parameters are equal.

As a result, the ISCP generates an Authorize_Termination message for the SSP B 106. The parameters of this message are as follows:

CallingPartyID=8477279999, marked allowed
DISPLAYTEXT
CallingPartyName=AccessCode
CallingAddress=10 digit access code
Date and Time of Day The message is received at the SSP B 106. If the called communication station 114 is idle and call forwarding all calls is not active, SSP B will complete or terminate the call (to station 114). The Display Text information returned in the Authorize_Termination message will be provided to the called communication station 114 between the first and second ring tones.

FIG. 5 is a flow diagram illustrating call processing in the system of FIG. 1 when the Access Code Authorize_Termination message is received at SSP B, instructing SSP B to attempt to complete the call to called communication station 114. The method begins at block 500.

In the embodiment of FIG. 5, at block 502 the SSP B 106 (FIG. 1) receives an Authorize_Termination message from the ISCP 102. In response to the received Authorize_Termination message, the SSP B 106 will attempt to complete the call.

At block 504, the SSP B 106 determines if the called party has activated call forward universal (CFU), in which all calls are forwarded to a specified directory number or forwarded DN. The forwarded DN may be another subscriber's telephone or may be a voice mail number. If CFU is activated, control proceeds to block 522. Otherwise, at block 506, the SSP B 106 determines if the called communication station is idle. The station is idle if it is not off hook or otherwise engaged in a call. If not, at block 508, the SSP B 106 determines if the called communication station has call forward on busy provisioned. If so, calls will be forwarded when the called communication station is busy and control proceeds to block 522. If the called communication station does not have call forward on busy provisioned then at block 510 the SSP B 106 terminates the call to a busy tone. The calling party (i.e., SN/IP 110) hears a busy tone, indicating that the called communication station is engaged in a call.

If, at block 506, the called communication station is idle, at block 512 the SSP B 106 rings the called communication station and provides the Displaytext parameters. The Display Text is provided to the called communication station 114 in the conventional manner, between the first and second ring tones. If the called party has suitable customer premises equipment (CPE), the Display Text is provided on the CPE display.

At block 514, the SSP B 106 determines if the called communication station is answered. This may be done, for example, by setting a timer when ringing is initiated at block 512 and, upon expiration of a period such as 24 or 30 seconds on the timer, determining the call is not answered. If the call is answered, the SSP B 106 completes the called to the called communication station, block 516. The method ends at block 520.

Otherwise, at block 518, the SSP B 106 determines if the called communication station is provisioned with call forward on no answer. In this service, if calls are not answered within the time set by the timer, calls are automatically forwarded to a specified number. If the called communication station is not provisioned with this service, the SSP B 106 continues ringing the called communication station, block 512, until the call is answered or the calling party (i.e. SN/IP 110) terminates the call. If the called communication station is provisioned with call forward on no answer service, control transfers to block 522.

In the exemplary embodiment, all forwarded calls are processed beginning at block 522. If any of the call forwarding options is set, SSP B 106 does not determine if the call is forwarded to the called party's voice mail box or to another customer directory number. Rather, SSP B 106 forwards the call and the forwarded destination is determined on the forwarded directory number.

At block 522, SSP B 106 sends an initial address message to the SSP that is associated with the forwarded DN, 847-438-3333 in this example. In one embodiment, the parameters for the IAM sent by SSP B include the following:

CallingPartyID=8477279999, marked allowed
CalledPartyID=8474383333
OriginalCalledID=8472482222
RedirectingPartyID=8472482222

The forwarded SSP determines if the call is being routed to voice mail or to another customer, block 524. If the call is being forwarded to voice mail, at block 526, the forwarded SSP associated with DN 8474383333 processes the IAM and terminates the call to the voice mail box associated with the original called communication station because of the OriginalCalledID parameter. The calling party hears the voice mail greeting, if any, set by the called party, rather than a generic voice mail greeting.

For a call being forwarded to another customer's directory number, if the call is an access code call, the call completes to the forwarded DN, block 528. If the customer associated with DN 847438-3333 has the privacy management service or other caller identification service, the call will not be interrupted because the CallingPartyID parameter has presentation allowed. A TR1188 query will be sent to the Line Information Database (LIDB) to retrieve the caller name for the CallingPartyID. Since this directory number (8477279999) has previously been established as specific to access code calls, the TRI 188 query will return CNAME="Access Code."

This call then completes to directory number 847 438 3333. The customer's CPE displays the following text from the Display Text parameter: "Name=Access Code," "number=847 727 9999," and the date and time.

Thus, the caller, who entered the access code in response to the prompt from the call management service, does not have to interact with the service a second time. The parameters of the messages associated with the call are adjusted and tested at the AIN components to ensure that the call is completed properly and will all the necessary information.

It is to be noted that the methods and apparatus described herein may be embodied as one or more computer readable program codes and stored on a computer readable medium such as a magnetic disk or and optical medium. Further, the computer readable program code may be embodied as an electrical signal communicated by wireline or wirelessly and encoding the computer readable program code. The program code may be configured to operate in conjunction with any of the devices described herein, such as the ISCP, one or more SSPs or SN/IP, any combination or the equivalent thereof.

From the foregoing, it can be seen that the present embodiments provide method and apparatus for processing an access code call in a caller preview service. When the SN/IP originates a new call to the caller preview subscriber, the call setup message indicates that the calling party entered an access code. The service logic uniquely configures the setup message that is passed over the primary rate interface (i.e., trunk group) to the service switching point. The messages separately identify at the ISCP incoming presentation restriction access code calls from the SN/IP. This allows these calls to receive different treatment at the ISCP from other presentation restricted calls. For example, the access code calls are allowed to complete and display the access code name, while other presentation restricted calls are handled by the caller preview service logic and forwarded to the SN/IP for processing. If the call is busy or unanswered, the access code call will still be correctly routed to the called party's voice mail box.

It is to be understood that a wide range of changes and modifications to the embodiments described above will be apparent to those skilled in the art and are contemplated. It is therefore intended that the foregoing detailed description be regarded as illustrative rather than limiting, and that it be understood that it is the following claims, including all equivalents, that are intended to define the spirit and scope of the invention.

What is claimed is:

1. A method of processing a blocked call, the method comprising:
   identifying a call that does not include calling line information as a privacy management service call;
   providing the identified privacy management service call to a network device for processing;
   receiving, at the network device, access code provided by a calling party at a calling communication station;
   in response to receiving the access code initiating a new call to a called party with two call parameters having a predetermined matching relationship, wherein initiating the new call includes setting a calling party identifier parameter equal to the access code, setting a called party identifier parameter equal to a directory number of a called communication station; and setting one of the two call parameters equal to the directory number of the called communication station; and
   comparing the called party identifier parameter and one of the two call parameters; and
   completing the new call to the called communication station with calling party information identifying the calling party based at least in part on the received access code when the called party identifier parameter and one of the two call parameters match.

2. The method of claim 1 further comprising:
   prompting the calling party to dial the access code;
   detecting the access code entered by the calling party; and
   validating the access code.

3. The method of claim 1 further comprising:
   prompting the calling party to provide an audible access code for the access information;
   detecting the audible access code entered by the calling party; and
   validating the audible access code.

4. The method of claim 1 wherein the calling party information is configured to produce a calling party indication at Customer Premise Equipment associated with the called communication station.

5. A call processing method in a telecommunication system, the call processing method comprising:
   receiving a call from a calling party at a network device, wherein the call does not include calling line information;
   interrupting the call in response to the lack of calling line information;
   providing call disposition options to the calling party;
   receiving access code from the calling party;
   in response to receiving the access code initiating a new call to a called communication station, the new call including a plurality of call parameters;
   wherein one of the call parameters includes the access code configured for presentation at a Customer Premise Equipment;
   wherein; two; of the call parameters define a predetermined relationship recognizable by the network device to indicate the new call as an access code call;
   prompting the calling party to dial the access code;
   detecting the access code entered by the calling party; and
   validating the access code;
   wherein initiating the new call comprises:
      generating a primary rate interface setup message including
         setting a calling party identifier of the primary rate interface setup message to the access code,
         setting a called party identifier of the primary rate interface setup message to a directory number of the called communication station; and
         setting another call parameter of the primary rate interface setup message to the directory number of the called communication station.

6. The method of claim 5 further comprising:
   marking the calling party identifier private.

* * * * *